United States Patent [19]

Bahder et al.

[11] 4,145,567
[45] Mar. 20, 1979

[54] SOLID DIELECTRIC CABLE RESISTANT TO ELECTROCHEMICAL TREES

[75] Inventors: George Bahder, Edison; George S. Eager, Jr., Upper Montclair; Carlos Katz, Edison, all of N.J.

[73] Assignee: General Cable Corporation, Greenwich, Conn.

[21] Appl. No.: 803,754

[22] Filed: Jun. 6, 1977

[51] Int. Cl.² .............................................. H01B 9/02
[52] U.S. Cl. ...................................... 174/107; 156/56; 174/13; 174/110 F
[58] Field of Search ............... 174/107, 102 R, 102 D, 174/110 PM, 110 AR, 110 F, 120 AR, 110 SR, 120 R, 13; 156/56

[56] References Cited

U.S. PATENT DOCUMENTS

| 3,287,489 | 11/1966 | Hvizd, Jr. | 174/120 R |
|---|---|---|---|
| 3,344,228 | 9/1967 | Woodland et al. | 174/107 |
| 3,373,244 | 3/1968 | Holland | 174/102 R |
| 3,485,689 | 12/1969 | Polizzano | 174/110 SR |
| 3,586,756 | 6/1971 | Garner | 174/110 PM |
| 3,687,748 | 8/1972 | Clock | 174/110 F |
| 3,745,232 | 7/1973 | Johnson et al. | 174/110 F |
| 3,843,830 | 10/1974 | Priaroggia et al. | 174/120 SC X |
| 3,878,319 | 4/1975 | Wahl | 174/120 SC X |
| 3,885,085 | 5/1975 | Bahder et al. | 174/120 AR |

FOREIGN PATENT DOCUMENTS

| 2538133 | 3/1977 | Fed. Rep. of Germany | 174/13 |
|---|---|---|---|
| 1438610 | 6/1976 | United Kingdom | 174/120 SC |

Primary Examiner—Laramie E. Askin
Assistant Examiner—E. F. Borchelt
Attorney, Agent, or Firm—Roy C. Hopgood; John M. Calimafde; Charles W. Neill

[57] ABSTRACT

This cable for high-voltage, alternating current power transmission cables not only reduces the access of moisture into the cable but reduces access of moisture to the inner face of the insulation to such an extent as to make the cable highly resistant to the formation of electrochemical trees in the solid extruded insulation of the cable. A compressible layer of closed cell, foamed plastic is extruded over the outside surface of the insulation; and a metallic shield fits tightly around the compressible layer, the metallic shield being a longitudinally folded tape with a lap seam which is preferably bonded to prevent ingress of air or other fluid into the cable. If the conductor is stranded, sealant is used to prevent ingress of moisture, or of air, and the humidity it contains into the cable at cable ends.

17 Claims, 4 Drawing Figures

SOLID DIELECTRIC CABLE RESISTANT TO ELECTROCHEMICAL TREES

RELATED PATENTS

This invention is an improvement over the invention disclosed in U.S. Pat. No. 3,943,271, issued Mar. 9, 1976. Other prior art in the same field includes U.S. Pat. Nos. 2,754,352, issued July 10, 1956; 3,943,271 and 3,885,085.

BACKGROUND AND SUMMARY OF THE INVENTION

High voltage power transmission cable, insulated with extruded polyolefin insulation, may have their service life significantly shortened by the formation of electrochemical trees that form in the insulation.

These electrochemical trees appear at imperfections within the insulating system and at imperfections located at the interface with the shields. The mechanism of tree formation is based on electrical forces caused by inter-reaction between the voltage stress (caused by applied voltage to the cable) and space charge changes formed within the insulating system. Therefore, significant growth of electrochemical trees occurs at AC voltage, and the rate of growth increases with an increase in the frequency of the voltage applied. The rate of growth also increases with an increase of voltage stress within the insulating system of the cable.

This invention provides a high voltage cable construction with sealed metallic shields which prevent air and moisture ingress into the insulation structure as long as they are intact; and if punctured, the design is such that air or other fluids cannot flow longitudinally along the cable, and vapor, such as is present in air, cannot enter the cable and progress lengthwise therein. The invention also includes unique structural features which enable the cable to be useful with various types of sealed metallic shields.

We have discovered that properly sealed cables can be made so that they remain practically tree-free throughout their life. We have used a standard, accelerated electrochemical treeing test method (having industry-wide acceptance) and consisting of subjecting the insulation of the cable to a voltage stress of 85 volts per mil at a 7 to 8 kHz frequency, at a conductor temperature of 90° C. for 30 days while water is maintained at the outside of the cable and, if possible, among the conductor strands. This test method and its correlation to tree growth has been described in IEEE paper T73 496-7.

The cable has a conductor, semiconducting conductor shield, extruded insulation over the conductor shield, a semi-conducting shield around the insulation; and if the conductor is stranded, sealant is used in the interstices of the conductor to prevent air from entering the cable at ends of the cable during manufacture, cutting, terminating and splicing.

Around the outside of the insulation shield, there is a compressible layer of closed cell, foamed plastic material that prevents moisture located radially beyond the compressible layer from reaching the insulation. A metal shield surrounds the compressible layer and preferably maintains some pressure against the compressible layer so that no air or other fluid can travel along the interface between the compressible layer and the metal shield. The metal shield can be bonded to the compressible layer as further insurance against passage of fluid along the cable between the shield and the compressible layer.

The metal shield is preferably made by bending a metal tape of copper or aluminum around the compressible layer and with edges of the tape forming a lap seam. Seams are provided to seal the lap seam against entrance of air or other fluid through the seam into the cable. Lead may be used for the shield. The seam can be sealed with a sealant, but preferably the seam edges are bonded to one another by soldering or adhesive such as epoxy or by adhesive polyethylene.

Various details and some alternate constructions will be described as the description proceeds.

BRIEF DESCRIPTION OF THE DRAWING

In the drawing, forming a part hereof, in which like reference characters indicate corresponding parts in all the views.

DESCRIPTION OF PREFERRED EMBODIMENTS

Figure 1:
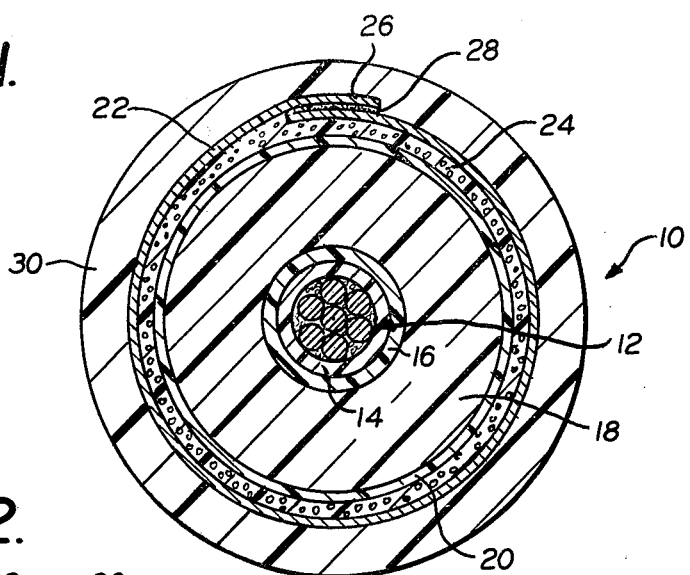
FIG. 1 is a cross-sectional view of a high-voltage power transmission cable made in accordance with this invention.

FIG. 1 shows a cable 10 having a conductor 12, including a multiplicity of strands which are twisted in the usual way to provide a helical path for the different individual strands, which are preferably made of aluminum or copper. The interstices between the individual strands are filled with a strand sealant, which is preferably made of ethylene propylene rubber compounded with a substantial amount of carbon black, so as to give it a putty-like consistency and a drip-point above 100° C.

A semiconducting conductor shield 14 is extruded over the filled conductor 12 with the shield 14 extending into any depressions in the circumference of the conductor 12 which have not been completely filled with sealant. The conductor shield 14 may be of conventional construction and is commonly made with polyethylene containing sufficient carbon black to make the polyethylene a semiconducting material.

Outside of the semiconducting shield 14, there is an emission shield 16, which is optional; and insulation 18 for the cable is extruded over the shield 14, or the emission shield 16 if there is an emission shield. The insulation 18 is cross-linked to make it capable of withstanding the high temperatures encountered in high-voltage power transmitting cables.

A semiconducting insulation shield 20, which may be made of material similar to that used for the conductor shield 14, is extruded over the insulation 18. The construction thus far described is similar to the cable disclosed in U.S. Pat. No. 3,943,271.

The cable core, thus far described, is covered with a metal shield 22, which is preferably formed by folding a copper strip longitudinally around the cable core, and there is a layer of sealing material 24 located between the metal shield 22 and the cable core. The metal shield has a lap seam 26 with the edges bonded by solder 28 or other means for obtaining a water-tight and air-tight seal along the seam 26.

Because of the high coefficient of thermal expansion of plastic material as compared with metal, modern high-voltage power transmission cables have been made with metal shields having lap seams with the edges of the seam free to slide over one another to accommodate expansion of the cable core when the cable is heated by the flow of a heavy current. Such cables have important advantages over earlier cables where the expansion of the plastic of the cable core stretched the metal shield so that upon cooling of the cable, the metal shield did not touch the cable core around the entire circumference, and the dissipation of heat from the cable was seriously impaired. With metal shields strong enough to avoid stretching, the insulation of the cables where damaged by excessive compression when the cable was heated by a heavy current flow.

We have discovered that metal shields with lap seams can be bonded so that the seam edges are no longer free to slide over one another to accommodate expansion of the cable core, and that damage to the cable as a result of the differences in the coefficient of expansion of the core and shield can be avoided. This invention places a closed cell, foamed layer of plastic material between the cable core and the metal shield. This compressible layer permits the cable core to increase in cross-section as it becomes highly heated, and the compressible layer between the cable core and the inside surface of the metal shield accommodates the expansion of the core by decreasing in radial thickness. When the cable cools, the compressible layer expands again, so that it maintains contact with the cable core and the metal shield at all times.

The pressure exerted by the compressible layer against the cable core and the shield is sufficient to prevent any flow of fluid lengthwise of the cable if the metal shield becomes punctured by lightning or other cause.

The compressible shield 24 is preferably semiconducting and made of plastic having a high melting point. To provide adequate compression, the gas/solid ratio is preferably 20 or more, and the conductivity of the layer is 1 Mega ohm-cm maximum at operating temperature of the cable.

When the metal shield 22 is made of a copper tape, the lap seam 26 can be cemented together with adhesive; for example, epoxy; or the lapped edges can be soldered or welded at the overlap. For purposes of this invention, all of these expedients can be considered as having the seam edges "adhered" to one another by an impervious bond. The copper tape shield 22 is preferably applied tightly over the compressible layer 24 to prevent water or other fluid from moving longitudinally along the length of the cable in the event of a puncture of the metal shield; but in cables where the compressible layer must accommodate considerable expansion of the cable core toward the metal shield, the shield can be applied to the compressible layer with less pressure and can be adhered to the compressible layer to prevent any migration of water or other fluid lengthwise of the cable between the compressible layer and the metal shield.

The metal shield 22 is covered with an extruded jacket 30 which adheres to the outside surface of the metal shield 22; and which can be made of polyethylene or polyvinyl chloride; and can be made semiconducting, if desired. The thickness of the metal shield 22 is preferably between 3-20 mils for uncorrugated shields, and between 5-20 mils if the shield is corrugated.

Figure 2:
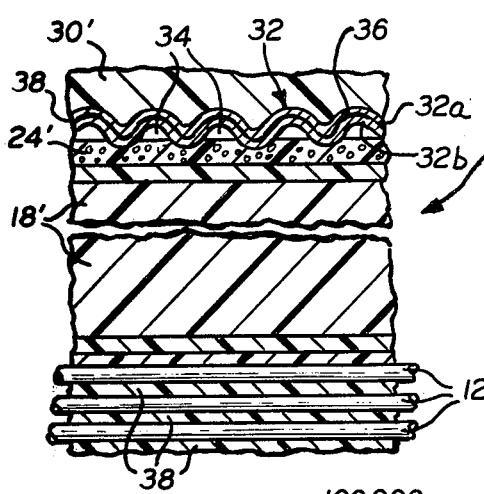
FIG. 2 is a greatly enlarged longitudinal, fragmentary, sectional view showing a construction similar to FIG. 1 but used with a corrugated metal shield.

FIG. 2 shows a cable 10' which has a metal shield 32 which is corrugated with corrugations that extend circumferentially around the cable. The outer lap of the shield 32 along its seam is indicated by the reference character 32a, and the inner lap is indicated by the reference character 32b. Other parts of the cable 10' are indicated by the same reference characters as in FIG. 1 but with a prime appended.

It is not necessary for the compressible layer 24' to extend upwardly to the top of the spaces 34 formed by the corrugations of the shield 32. It is sufficient that the downwardly-extending portions of the corrugations compress the compressible layer 24' so that there is tight pressure, or that the corrugations which press into the compressible layer 24' be adhered to the confronting surface of the compressible layer 24'. Since the corrugations 32 are circumferential and not helical, any spaces 34 above the compressible layer 24' do not communicate with one another and thus any water or other fluid that enters one of these spaces cannot travel lengthwise along the cable.

The heavy black line 36 represents the adhesive, solder or welding which connects the lapped seams of the metal shield 32. The sealant which fills the interstices of the stranded conductor, comprising the strands 12', is indicated by the reference character 38.

Figure 3:
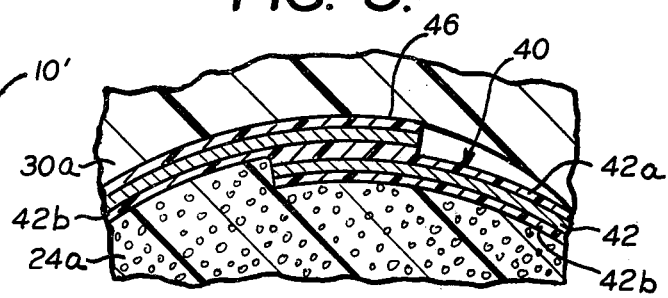
FIG. 3 is a greatly enlarged, fragmentary, sectional view through the seam of the metal shield of another modified form of the invention where the metal shield is made of aluminum instead of copper.

FIG. 3 is a fragmentary view showing a metal shield 40 which is made of aluminum. In order to protect the aluminum from corrosion, it is coated with corrosion-inhibiting coating 42a and 42b applied to opposite sides of an aluminum tape 42. This tape 42 can be used in place of the copper tape which is used for the metal shield 22 in FIG. 1. When using the aluminum tape 42 with corrosion-protecting layers on both sides of it, the lap seam 46 can have its overlapping edges bonded together by fusing the outer coating 42a of the underlapped seam with the coating 42b on the overlapped seam, as shown in FIG. 3.

The metal shield 40 can be wrapped tightly around the compressible layer 24a or can be applied with less pressure and with adhesive securing the confronting surfaces of the metal shield 40 and the compressible layer 24a to one another with a fluid-tight connection. An outer jacket 30a corresponds to the jacket 30 shown in FIG. 1. This outer jacket 30a is preferably adhered to the outer coating on the aluminum strip 42.

When using a non-corrosive metal shield, such as copper, the foamed plastic which forms the compressible layer 24 of FIG. 1 is made of semiconducting, thermosetting, or high melting point plastic material which contacts with the inside surface of the copper shield. When using aluminum, as the metal shield, as in FIG. 3, the compressible layer 24a is preferably a high SIC thermosetting extruded material having a dielectric constant greater than 4. The foaming ratio (gas/solid) is 20 or more, as with the compressible layer 24 of FIG. 1.

Figure 4:
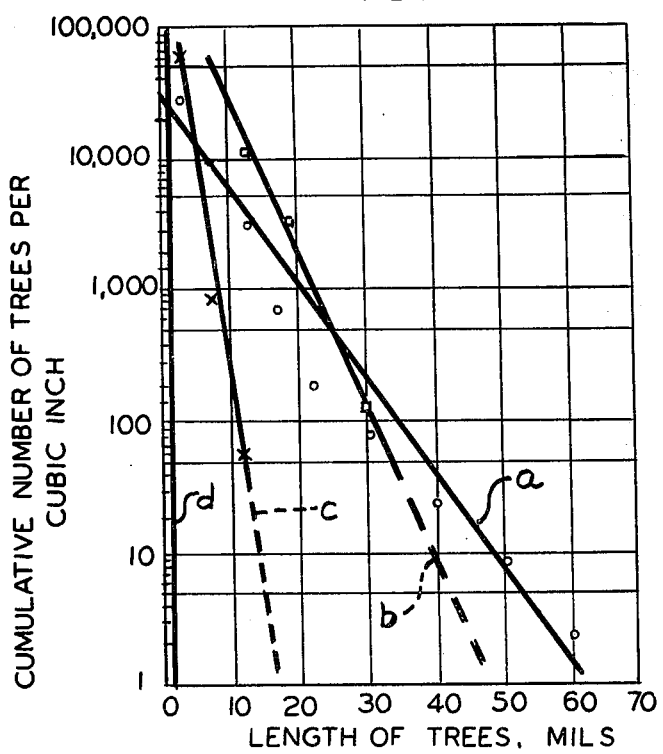
FIG. 4 is a graph showing the improved results obtained with this invention as compared with three other constructions.

FIG. 4 is a graph showing the comparative results between this invention and three other constructions. The constructions tested in order to find out the number of electrochemical trees and the length of the trees, which developed over an accelerated test period, is shown in FIG. 4 with the cumulative number of trees per cubic inch plotted on the ordinate and the length of trees plotted along the abscissa.

The cables used for FIG. 4 were cables with a high propensity for the development of electrochemical trees. These cables have the following general characteristics:

(a) 1/C, 250 kcmil, aluminum conductor, extruded conductor shield, 220 mils XLP insulation, extruded insulation shield, cable cured in steam.

(b) 1/C, 350 kcmil, aluminum conductor, extruded conductor shield, 230 mils XLP insulation, extruded insulation shield. Cable cured dry (no steam).

(c) 1/C, 250 kcmil, aluminum conductor, inter-strand space filled by semiconducting compound, extruded conductor shield, 220 mils XLP insulation, extruded insulation shield. The conductor of this cable had its interstrand space filled with a compound as described in U.S. Pat. No. 3,943,271. The cable was cured in steam.

(d) 1/C, 350 kcmil, aluminum conductor, inter-strand space filled by semiconducting compound, extruded conductor shield, 230 mils of XLP insulation, extruded insulation shield. Cable cured dry (no steam). A layer of extruded, foamed semi-conducting ethylene propylene rubber was applied over the insulation shield and over the foamed layer a longitudinally corrugated 5 mils thick copper tape, with its overlap sealed by epoxy cement. A polyethylene jacket was applied over the copper tape. This cable was made in accordance with the novel construction described in the present disclosure.

In the case of samples (c) and (d), no water could be injected among the conductor strands; however, a reservoir with water was installed at an elevated level and connected to the end of the conductor strands. This connection was maintained throughout the duration of the test period.

At the end of the 30-day testing period, similar sections were cut from all four cables, sliced and examined for the presence of electrochemical trees. The results in the form of cumulative number of trees per cubic inch of insulation vs. tree length are plotted in FIG. 4.

The lines which represent the results obtained in the tests on the different cables are indicated by letters a, b, c, and d corresponding to the cables having the characteristics designated by the same letters. As can be seen, the construction of cable (d) gives an effective means to practically eliminate the growth of electrochemical trees.

The compressible layer is preferably semiconducting when used with a copper metallic shield and is made with high SIC when used with an aluminum metallic shield. The high SIC is obtained by adding high dielectric constant filler—for instance, titanium dioxide—to the material which is used to make the foamed compressible layer. Instead of titanium dioxide, the compressible layer can be given a high SIC by using as a filler barium titanate (capacitor or electronic grade) or magnesium zirconate.

While copper and coated aluminum are the preferred materials for the metal shield of this invention, other metals can be used such as lead.

The preferred plastic materials for use in the conductor shield 14 and for the insulation 18 are cross-linked polyethylene, polyethylene, blends thereof or rubber, such as ethylene propylene rubber.

The preferred embodiment of the invention has been illustrated and described but changes and modifications can be made and some features can be used in different combinations without departing from the invention as defined in the claims.

What is claimed is:

1. A power transmission cable for high-voltage, alternating current and resistant to the formation of electrochemical trees, said cable including in combination a core comprising a conductor with strand sealant throughout the length of the conductor in any interstices of the conductor, a semiconducting conductor shield surrounding the conductor and extruded over the conductor, an extruded solid unfoamed polyolefin insulation extruded over the conductor shield, said insulation having the dimension of its radial thickness as great as the diameter of the conductor, a closed cell, compressible, foamed plastic layer surrounding the outside of the core and in contact therewith, a metal shield around the foamed plastic layer and holding the foamed plastic layer under some compression against the core to ensure intimate surface contact between the metal shield and the compressible layer, the metal shield having a seam with the major component of the direction of extent of the seam extending in the direction of the length of the cable, and means for sealing the seam edge portions together to prevent air or liquid from entering the seam, the compressibility of the foam layer being correlated with the seal of the seam of the metal shield to withstand the high coefficient of thermal expansion of the insulation as compared to the lower coefficient of expansion of the metal, and an extruded outer jacket over the other parts of the cable and fitting snugly around the rest of the cable that the outer jacket encloses.

2. The cable described in claim 1 characterized by the foamed layer having a foaming ratio (gas/solid) greater than about 20 and means for preventing air or liquid from entering the cable at the seam.

3. The cable described in claim 2 characterized by the means for preventing air or moisture from entering the cable at the seam being a material that bonds the edges of the seam together in a fluid-tight connection.

4. The cable described in claim 2 characterized by the surface of the compressible layer contacting with the metal shield over substantially the entire confronting areas of the compression layer and shield and being bonded thereto over said area.

5. The cable described in claim 2 characterized by the means for preventing air or moisture from entering the cable at the seam being a flooding compound that covers a part of the metal shield including the parts that form the seam of the metal shield.

6. The cable described in claim 2 characterized by the metal shield being copper and the seam being a lap seam having confronting faces at the overlap, and a layer of adhering material between the confronting faces bonding the edges of the seam together in a fluid-tight seam.

7. The cable described in claim 2 characterized by the metal shield being aluminum with polyethylene fused to the surface of the aluminum for corrosion protection, the seam being a lap seam having confronting faces that overlap, and the seam being bonded together in a fluid-tight connection by fused areas of polyethylene bonded to the confronting faces of the seam.

8. The cable described in claim 2 characterized by an overall jacket around the full circumference of the outside of the metal shield and bonded to the outside surface of the metal shield.

9. The cable described in claim 8 characterized by the overall jacket being polymeric material extruded over the metal shield, the jacket being made of material from the group consisting of polyethylene and polyvinyl chloride.

10. The cable described in claim 2 characterized by the metal shield being copper tape having a thickness of from 3 to 20 mils, and material on the copper at the seam overlap connecting the laps of the seam together to make the seam fluid-tight, the compressible layer being semi-conducting with a conductivity of not greater than 1 Mega ohm-cm.

11. The cable described in claim 2 characterized by the metal shield being aluminum and the compression layer being of high SIC thermosetting extruded material having a dielectric constant greater than four.

12. The cable described in claim 11 characterized by the high SIC resulting from a high dielectric constant filler, said filler being titanium dioxide or its equivalent.

13. The cable described in claim 2 characterized by the metal shield being a corrugated metal tape folded longitudinally around the compressible layer and the corrugations extending transverse of the length of the cable with the surfaces of the corrugations contacting the compressible layer.

14. The cable described in claim 1 characterized by the compressible foamed layer being a composition that returns to its original thickness following radial expansion and contraction of the cable core, and that maintains firm contact with the surfaces of the cable between which it is compressed with sufficient pressure to provide a seal against fluid penetration along said surfaces.

15. The cable described in claim 14 characterized by the closed cell, compressible foamed plastic being made of plastic material from the group consisting of polyethylene, cross-linked polyethylene, ethylene propylene rubber and blends thereof.

16. The cable described in claim 1 characterized by the conductor being stranded, and sealant within the interstices of the stranded conductor and at locations around the circumference the reof preventing air from entering the cable along the strands from cable ends that are exposed to the ambient atmosphere during manufacture, terminating and splicing.

17. The method of making a power cable, that has a conductor, a semiconducting conductor shield, an extruded layer of solid polyolefin insulation, a semiconducting insulation shield, a metal shield surrounding the insulation shield and having a lap seam, resistant to the formation of electrochemical trees in the extruded insulation, which method comprises applying between the insulation shield and the metal shield a layer of closed cell, compressible, foamed plastic with a foaming ratio (gas/solid) greater than approximately 20, applying the foamed layer so as to completely surround the circumference of the insulation shield without any gaps in the circumference of the compressible layer, and applying a tape as the metal shield over the compressible layer with a seam where opposite sides of the tape overlap one another, and sealing the lap seam by bonding the overlapping edges of the tape with an airtight bond between the edges.

* * * * *